United States Patent Office 2,745,380
Patented May 15, 1956

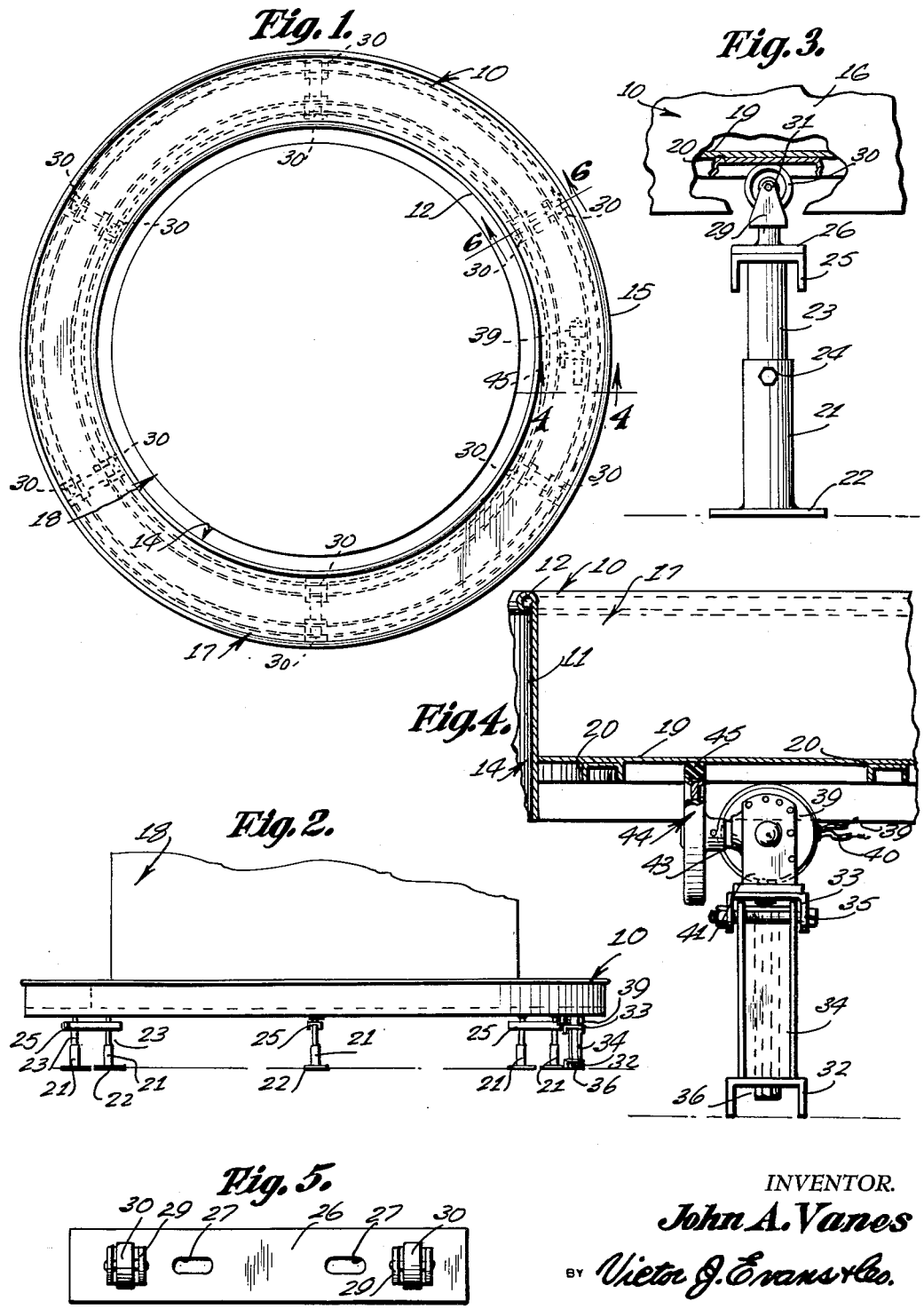

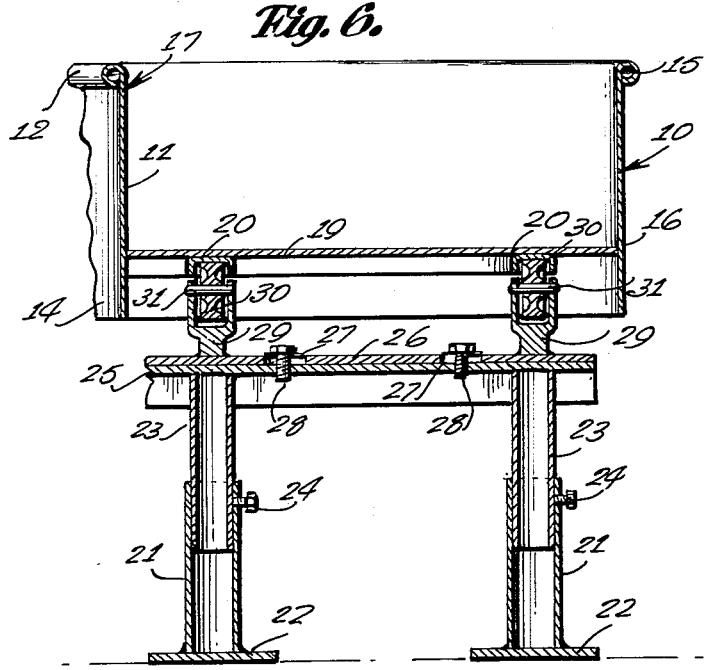
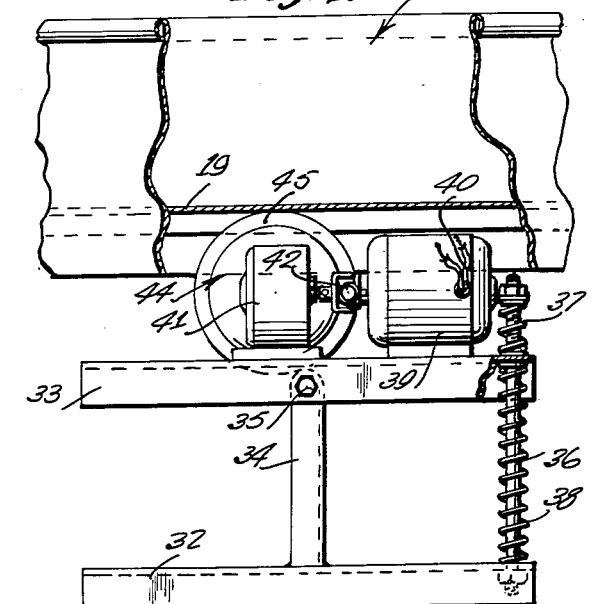

2,745,380

REVOLVING TROUGH CATTLE FEEDER

John A. Vanes, Brazil, Ind.

Application December 22, 1954, Serial No. 477,088

5 Claims. (Cl. 119—52)

This invention relates to a feeding device, and more particularly to a feeding device for livestock or cattle.

The object of the invention is to provide a cattle feeding device which is adapted to be revolved or rotated around a silo whereby the feeding device can be uniformly and easily filled with grain or other material from the silo and whereby the cattle or livestock can readily gain access to the foodstuff in the feeding device.

Another object of the invention is to provide a cattle or livestock feeding device which can be easily filled and which will feed a plurality of cattle at one time, the device being constructed so that there will be no possibility of the animals accidentally harming themselves on the device.

A further object of the invention is to provide a cattle feeding device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the cattle feeding device, constructed according to the present invention.

Figure 2 is a side elevational view of the cattle feeding device, showing the silo in broken lines.

Figure 3 is an enlarged fragmentary elevational view showing one of the rollers or wheels which engage the bottom of the housing, and with parts broken away and in section.

Figure 4 is an enlarged sectional view taken on the line 4—4 of Figure 1.

Figure 5 is a plan view of one of the plates.

Figure 6 is an enlarged fragmentary sectional view showing the rollers which support the housing.

Figure 7 is an enlarged fragmentary elevational view, with parts broken away and in section, showing the drive mechanism for rotating the housing.

Referring in detail to the drawings, the numeral 10 designates a circular housing or trough, and the housing 10 includes a vertically disposed circular inner wall 11 which may have its upper edge rolled as at 12 for strengthening the wall. The central portion of the housing 10 is open as at 14 and the central open portion 14 receives therein a conventional cylindrical silo 18.

The housing 10 further includes an outer circular vertically disposed wall 16 which is arranged in concentric relation about the inner wall 11, and the upper edge of the wall 16 is rolled as at 15 whereby cattle or other livestock eating from the trough 10 will not be harmed by ragged edges or the like. The space within the housing 10 is indicated by the numeral 17 and serves as a storage area for grain or other foodstuff which the animals eat. A horizontally disposed bottom wall 19 extends between the inner wall 11 and outer wall 16 and is secured thereto.

The housing 10 is mounted for rotary movement around the silo 18 so that the housing 10 can be uniformly filled with material from the silo. Thus, secured to the undersurface of the bottom wall 19 is a pair of concentrically arranged circular tracks 20. Positioned below the housing are a plurality of vertically disposed spaced parallel casings 21 which each have a flat foot 22 on their lower end. The casings 21 are arranged in pairs, and adjustably mounted in each casing 21 is a hollow tube 23. A suitable securing element such as a set screw or bolt 24 extends through the casing 21 and engages a tube 23 for maintaining the tube 23 immobile in its various adjusted positions. Secured to the upper end of each pair of tubes 23 is a horizontally disposed channel member 25, and supported by each channel member 25 is a plate 26, Figures 5 and 6. Each plate 26 is provided with a pair of slots 27, and suitable securing elements such as bolts 28 extend through the slots 27 and into engagement with the channel members 25. Due to the provision of the slots 27, the plates 26 can be adjusted in order to properly align the parts.

Extending upwardly from each plate 26 is a pair of brackets 29, and a roller or wheel 30 is journaled in each bracket 29 by means of a pin 31. The rollers 30 engage the tracks 20 so as to provide an effective support for the rotary housing 10.

A means is provided for rotating the housing 10, and this means comprises a base 32 which is arranged below the housing 10, Figure 7. Extending upwardly from the base 32 is a vertically disposed arm 34, and a support member 33 is pivotally connected to the arm 34 by means of a pin or bolt 35. A bolt 36 extends between the support member 33 and base 32, and the bolt 36 may have coil springs 37 and 38 thereon. Thus, by adjusting the bolt 36, the tension of the coil springs 37 and 38 can be varied whereby the relative position of the support member 33 can be adjusted. Supported on the member 33 and secured thereto is a motor 39 which can be connected to a suitable source of electrical energy by means of wires 40. A gear reduction unit 41 is connected to the motor 39 by means of a universal connection 42, and a shaft 43 leads from the gear reduction unit 41 to a wheel or roller 44. The wheel 44 may have a rubber ring 45 on its outer periphery, and the rubber ring 45 frictionally engages the undersurface of the bottom wall 19. Thus, as the motor 39 is actuated, the wheel 44 is rotated and since the rubber ring 45 engages the wall 19, then the housing 10 will be rotated. Thus, the space 17 within the housing 10 can be uniformly filled with material from the silo 18.

From the foregoing it is apparent that there has been provided a feeding device for cattle or livestock. In use the housing 10 is mounted or assembled around a conventional silo 18. The silo 18 may contain any suitable material which is to be fed to cattle and the material from the silo 18 is discharged into the space 17 in the housing 10 by any suitable mechanism. By actuating the motor 39, the wheel 44 will rotate and this will cause rotation of the housing 10 about the silo 18. Thus, the material being emptied from the silo 18 will uniformly fill up the housing whereby a plurality of cattle will be able to eat from the trough or housing. The rollers 30 engage the tracks 20 to minimize friction as the housing rotates, and the springs 36 and 37 provide a yieldable support for the motor and wheel 44. The plate 26 can be moved due to the provision of the slots 27 so as to properly center or align the wheels 30 in the tracks 20. The various supports are positioned beneath the housing 10 so that the cattle will not cut themselves by hitting their legs on these members. The housing or trough 10 receives the silage after it is unloaded from the silo 18 and any suitable mechanical unloading device can be used for unloading silage from the silo 18 into a chute which extends down the outside of the silo to empty the material into the space 17. Thus, no manual labor is required to provide the silage for the cattle. Also, there is very little space utilized by the device since it surrounds the silo. The diameter of the housing can be varied as desired, and by loosening the bolts 24, the legs or tubes 23 can be adjusted in the casing 21.

I claim:

1. In a cattle feeder, a circular housing for surrounding a silo and including a vertically disposed inner and outer wall arranged in concentric relation with respect to each other, a horizontally disposed bottom wall extending between said inner and outer walls and secured thereto, the top of said housing being open for receiving material from said silo and for permitting cattle to gain access to the material in said housing, a pair of concentrically arranged U-shaped tracks secured to the undersurface of said bottom wall, a plurality of hollow vertically disposed spaced parallel casings arranged below said housing and arranged in pairs, a tube adjustably mounted in each of said casings, a securing element extending through each casing and into engagement with the tube therein, a U-shaped channel member secured to the upper ends of each pair of tubes, a plate mounted on each of said channel members and provided with a pair of slots therein, securing elements extending through said slots and into engagement with said channel member, brackets extending upwardly from said plate, and rollers journaled in said brackets and engaging said tracks, and means for rotating said housing.

2. In a cattle feeder, a circular housing for surrounding a silo and including a vertically disposed inner and outer wall arranged in concentric relation with respect to each other, a horizontally disposed bottom wall extending between said inner and outer walls and secured thereto, the top of said housing being open for receiving material from the silo and for permitting cattle to gain access to the material in said housing, a pair of concentrically arranged U-shaped tracks secured to the undersurface of said bottom wall, a plurality of hollow vertically disposed spaced parallel casings arranged below said housing and arranged in pairs, a tube adjustably mounted in each of said casings, a securing element extending through each casing and into engagement with the tube therein, a U-shaped channel member secured to the upper ends of each pair of tubes, a plate mounted on each of said channel members and provided with a pair of slots therein, securing elements extending through said slots and into engagement with said channel member, brackets extending upwardly from said plate, and rollers journaled in said brackets and engaging said tracks, and means for rotating said housing, said means comprising a wheel having a yieldable ring on its outer periphery arranged in engagement with the undersurface of said bottom wall, a base arranged below said housing, an arm extending upwardly from said base, a support member pivotally connected to said arm, an elongated bolt extending between said support member and base, coil springs circumposed on said bolt, a motor mounted on said support member and adapted to be connected to a source of supply of electrical energy, a gear reduction unit operated by said motor, and a shaft connecting said gear reduction unit to said wheel.

3. The structure as defined in claim 2, and further including a horizontally disposed foot on the lower end of each of said casings.

4. The structure as defined in claim 2, wherein the upper edges of said inner and outer walls are rolled.

5. In a cattle feeder, a circular housing for surrounding a silo and including inner and outer walls arranged in concentric relation with respect to each other, a bottom wall extending between said inner and outer walls and secured thereto, the top of said housing being open for receiving material from said silo and for permitting cattle to gain access to the material in said housing, a pair of concentrically arranged tracks secured to the under surface of said bottom wall, a plurality of hollow casings arranged below said housing and arranged in pairs, a tube adjustably mounted in each of said casings, a securing element extending through each casing and into engagement with the tube therein, a channel member secured to the upper ends of each pair of tubes, a plate mounted on each of said channel members and provided with slots therein, securing elements extending through said slots and into engagement with said channel member, brackets extending upwardly from said plate, and rollers journaled in said brackets and engaging said tracks, and means for rotating said housing.

References Cited in the file of this patent

UNITED STATES PATENTS

| | | |
|---|---|---|
| 2,704,995 | Dueringer | Mar. 29, 1955 |
| 2,709,987 | Bubenzer | June 7, 1955 |